United States Patent [19] [11] 4,296,085
Banquy [45] Oct. 20, 1981

[54] PROCESS FOR THE PRODUCTION OF AMMONIA AND THE CORRESPONDING SYNTHESIS GAS

[76] Inventor: David L. Banquy, 39 Rue St-Placide, Paris, France, 75006

[21] Appl. No.: 131,837

[22] Filed: Mar. 19, 1980

[30] Foreign Application Priority Data

Jan. 7, 1980 [FR] France .............................. 80 00196

[51] Int. Cl.$^3$ .......................... C01B 2/02; C01B 2/30; C01C 1/04
[52] U.S. Cl. .................................. 423/359; 252/373; 252/376
[58] Field of Search ...................... 423/359, 360, 361; 252/376, 375, 373

[56] References Cited

U.S. PATENT DOCUMENTS

| 2,829,113 | 4/1958 | Barry et al. | 252/376 |
| 3,264,066 | 8/1966 | Quartulli et al. | 423/654 |
| 3,278,452 | 10/1966 | Vorum | 252/376 |
| 3,388,074 | 6/1968 | Reitmeier | 252/373 |
| 3,441,393 | 4/1969 | Finneran et al. | 252/376 |
| 3,442,613 | 5/1969 | Grotz, Jr. | 252/374 |
| 4,079,017 | 3/1978 | Crawford et al. | 252/273 |

FOREIGN PATENT DOCUMENTS 42-15376 8/1967 Japan .
1156003 6/1969 United Kingdom .

OTHER PUBLICATIONS

"Ammonia Technology, State of the Art and New Developments", by Zardi et al., Nitrogen (Nov./Dec. 1979).

Primary Examiner—O. R. Vertiz
Assistant Examiner—Wayne A. Langel
Attorney, Agent, or Firm—Burgess, Ryan and Wayne

[57] ABSTRACT

A process to produce ammonia from a hydrocarbon feedstock, involving basically the following steps:
Dividing the feedstock into two fractions,
Subjecting the first fraction to a primary steam reforming reaction, at high pressure and moderate temperature,
Combining the effluent from the primary reforming with the second fraction of the feedstock, and subjecting the mixture thereof to a secondary adiabatic reforming reaction with an amount of air in excess to that needed for ammonia synthesis,
Subjecting the synthesis gas produced to a CO shift conversion reaction, and then to $CO_2$ removal by solvent scrubbing, while the gas released by pressure letdown of said solvent is preferably recycled back upstream of the secondary reforming,
Methanation of the residual carbon oxides,
Removing the excess nitrogen present in the gas by cryogenic separation,
Compressing and feeding the final synthesis gas into an ammonia synthesis loop,
Recycling the purge gas from said ammonia synthesis loop to upstream the cryogenic separation.

9 Claims, 3 Drawing Figures

PROCESS FOR THE PRODUCTION OF AMMONIA AND THE CORRESPONDING SYNTHESIS GAS

BACKGROUND OF THE INVENTION

The present invention relates to the production of ammonia, and the corresponding synthesis gas, from a hydrocarbon containing feedstock. The industrial synthesis of ammonia is achieved through a synthesis gas containing a molal ratio of $H_2/N_2$ as close as possible to the stoichiometric value, that is 3.0, and some quantities of inert gases such as methane and argo, which one tries to reduce to the minimum. Processes for the production of ammonia by steam reforming of hydrocarbons are described in U.S. Pat. Nos. 2,829,113, 3,278,452, 3,264,066, 3,388,074 and 3,442,613.

In the process most commonly used for the production of ammonia synthesis gas, starting from a feedstock ranging from natural gas to naphtha, the total feedstock undergoes first a primary steam reforming reaction, at a temperature of about 800° C. and under a pressure of between about 25 to 35 bars, inside refractory tubes containing a reforming catalyst and externally heated by a set of burners. In said primary steam reforming, the amount of steam used in the reaction is usually expressed by the steam/carbon ratio, which is the number of moles $H_2O$ per atom of hydrocarbon carbon; said ratio is very often higher than 3.0, and usually closer to 4.0. The gas produced by the primary reforming reaction is then subjected to a secondary reforming reaction, in the presence of a reforming catalyst, at about 1000° C. and under the same pressure, in a reactor operating under essentially adiabatic conditions, by reacting with the amount of air which is just necessary to obtain in the final synthesis gas a molal ratio of $H_2/N_2$ equal 3.0. Said temperature of about 1000° C. is imposed by the need to have less than about 0.6 percent methane in the gas effluent from said secondary reforming, on a dry gas basis, in order to avoid excessive purge rates in the ammonia synthesis loop. Consequently, as the amount of air introduced in said secondary reforming is limited by the stoichiometry of the ammonia synthesis, it is found that the effluent gas temperature from the primary steam reforming should be above a certain minimum, which is about 800° C. The effluent gas from the secondary reformer is then treated for shift conversion of CO to $CO_2$, then scrubbed with an appropriate solvent to remove essentially all the $CO_2$ it contains, then methanated to convert into methane essentially all the residual carbon oxides it contains, which are poisons to the ammonia synthesis catalyst.

The above described conventional process for the production of ammonia synthesis gas has basically two major drawbacks. Firstly, a large amount of steam must be used in the primary steam reforming reaction, that is a steam/carbon ratio of at least about 3.0, due to the minimum ratio allowable to prevent carbon formation on the reforming catalyst, and in order to obtain an acceptable methane content at the outlet of the primary and secondary reformers. Said large amount of steam penalizes the conventional process in two ways, because not only does it represents an energy burden, but also because of the high investment required in the equipment to produce said steam. Secondly, because of the minimum temperature of about 800° C. at the outlet of the primary reformer, the metallurgy of the tubes used in said reformer requires restricting the operating pressure of the process to about 40 bars; consequently, a large amount of energy is required to compress the final synthesis gas produced, the volume of which is about four times that of the feedstock, to reach the ammonia synthesis pressure, usually comprised between 180 and 380 bars.

The process described in U.S. Pat. No. 3,4442,613 has the merit of avoiding the aforementioned second drawback, by using in the secondary reforming an amount of air appreciably larger than that required by the stoichiometry of the ammonia synthesis, the excess nitrogen being removed downstream in a cryogenic separation step. However, the amount of steam to be used in the primary reforming of this process is as large as that of the conventional process. Furthermore, the process of U.S. Pat. No. 3,442,613 operates with a methane content in the feed to the secondary reformer of less than 50 percent by volume, on a dry gas basis, which means the process does not take full advantage of reducing the degree of reforming in the primary reformer. Furthermore, said process requires the expansion of the process gas in a gas expander to produce the refrigeration required in the cryogenic purifier, which is an appreciable loss of energy, especially when considering that the expansion of hydrogen produces much less refrigeration than that of other gases such as nitrogen.

The process described in U.S. Pat. No. 3,278,452 permits the direct production of an ammonia synthesis gas with the stoichiometric composition, while achieving a substantial saving on the steam required for the primary reforming, because only a fraction of the feedstock may be treated in the latter, the other fraction going directly to the secondary reformer. Nevertheless, this process requires the use of oxygen enriched air in the secondary reformer, and the production of said oxygen is expensive in investment and in energy consumption. In addition, said process requires two or several steps in the secondary reforming reaction, with oxygen injection at the inlet of each step. Now it is virtually impossible to build such a system, because the oxygen to be injected in the second and subsequent steps is mixed with a gas at very high temperature coming from the first step, and this is a source of very elaborate technological problems; not only very special and expensive materials of construction must be used in the mixing zone, but also expensive provision must be made in the design for access to said zone for maintenance purposes. Furthermore, as the temperature of the reacting gas mixture increases regularly from the first to the last catalyst bed, the total volume of catalyst thus required is appreciably larger than that needed to carry the same reaction in a single step: in the latter case, all the catalyst would be at very high temperature, higher than or equal to the outlet temperature, because the reaction would be initiated before reaching the catalyst bed, thus raising appreciably the temperature of the mixture, and it is well known that the higher temperature of the catalyst increases appreciably the reaction rate and therefore reduces the volume of catalyst required.

The main object of the present invention is precisely to avoid simultaneously the two above mentioned drawbacks of the conventional process, that is on one hand to reduce appreciably the operating temperature of the primary reformer, which consequently allows an increase in the operating pressure and to reduce the corresponding fuel requirements, and on the other hand to reduce appreciably the amount of steam required for the process, thereby achieving an overall energy saving.

Another object of the present invention is to achieve a saving in investment as compared to the conventional steam reforming process for the production of ammonia.

Still another object of the present invention is to replace part of the expensive fuel required in the conventional process, that is a fuel with low sulfur and heavy metals contents, by electric power which would be cheaper if produced in power plants using coal or nuclear energy.

Furthermore, in the conventional process, the purge gas from the ammonia synthesis loop is either used as fuel or treated in costly additional facilities to recover the hydrogen therein. Another object of the present invention is to upgrade the hydrogen contained in said purge gas without the need to invest in additional facilities.

BRIEF SUMMARY OF THE INVENTION

This invention is based on the combination of three basic concepts for the production of ammonia from a light hydocarbon feedstock.

According to the first concept, the feedstock is divided into two fractions, and only the first fraction is subjected to a primary steam reforming reaction at very mild temperature, in the range of 680° to 820° C., which allows to operate at high pressure such as 50 to 80 bars, thereby achieving an appreciable saving in the energy required to compress the synthesis gas to the synthesis loop pressure. At the same time, this concept reduces appreciably the amount of process steam required for the overall reforming of the feedstock.

According to the second concept, the gas effluent from the primary reforming is combined with the second fraction of the feedstock, and the mixture thereof is subjected to a secondary adiabatic reforming, by reaction with preheated and compressed air, thus producing a synthesis gas at a temperature between 850° and 1100° C., and containing an amount of nitrogen appreciably in excess of that required for ammonia synthesis. Said synthesis gas undergoes then a shift conversion reaction to convert essentially all the CO to $CO_2$, then a solvent scrubbing to remove essentially all the $CO_2$, then a methanation reaction to convert into methane essentially all the residual carbon oxides present in the gas.

According to the third concept, all the excess nitrogen in the synthesis gas, after methanation, is removed in a cryogenic separation step, in which all the refrigeration requirements are supplied by the expansion to a low pressure of at least part of the residual gas which carries all said excess nitrogen. In effect, said cryogenic separation is equivalent to scrubbing the synthesis gas with liquid nitrogen at about $-180°$ C., thereby removing with said excess nitrogen all the residual methane from the synthesis gas, and the greatest part of the argon. The purified synthesis gas is then compressed and fed to the ammonia synthesis loop, from which the purge gas, as well as the gas flashed by the liquid ammonia blowdown, are both recycled back to the synthesis gas upstream the cryogenic separation, in order to remove the argon and upgrade the hydrogen contained therein.

The process of the present invention achieves an appreciable saving in energy as compared to the conventional process, due essentially to the production of the synthesis gas at high pressure and the consumption of a small amount of process steam. At the same time, a saving in investment is also achieved, due essentially to the great reduction of the primary steam reforming duty and the reduced steam requirements.

DETAILED DESCRIPTION AND PREFERRED EMODIMENTS

Any feedstock which can undergo a steam reforming reaction can be used as feedstock in the process of the present invention. In the frame of the present technology, the feedstocks which can be steam reformed are essentially composed of light hydrocarbons ranging from methane to a naphtha having an end point of about 220° C.

It is well known in the art that any catalytic process, whether steam or air reforming, for the production of synthesis gas from hydrocarbons, requires a thorough desulfurization of the feedstock before the reforming reaction. Consequently, I will assume that the feedstock to be used in the process of the present invention is adequately desulfurized.

One major feature of this invention is to treat in a primary steam reforming step only a fraction of the total feedstock, representing between 5 and 70 percent of the total feedstock. The effluent gas from this reaction is then mixed with the other fraction of the feedstock, and the mixture there of is subjected to a secondary reforming reaction with air, in the presence of a reforming catalyst, in a reactor operating adiabatically in which the amount of nitrogen thus introduced is appreciably larger than that required for the stoichiometric composition of the final synthesis gas. The pressure at the inlet of the primary reformer is at least equal to 30 bars, and preferably at least equal to 50 bars. The gas produced in the secondary air reforming is then subjected to a shift conversion reaction, to convert essentially all the CO to $CO_2$, and then to a scrubbing with an appropriate solvent to remove essentially all the $CO_2$, and then to a methanation reaction, in the presence of a methanation catalyst, to convert to methane essentially all the residual carbon oxides in the gas. After said methanation reaction, the synthesis gas has a molal $H_2/N_2$ ratio of less than 2.4, and preferably less than 2.0; said gas is then dried, and then cooled at about $-180°$ C. to condense essentially all the methane contained therein, and all the excess nitrogen, thereby obtaining a synthesis gas having the stoichiometric composition required for ammonia synthesis. Said synthesis gas is then compressed and injected in an ammonia synthesis loop, from which liquid ammonia is extracted. The purge gas from said ammonia loop, as well as the gas flashed from said liquid ammonia extraction, are cooled for partial ammonia removal, and then recycled in the process upstream of the cryogenic separation.

The oxygen contained in the excess air used in the secondary reformer helps to supply by combustion the heat required to reform the second fraction of the feedstock, which did not undergo a primary steam reforming reaction; said oxygen helps also to relieve the steam reforming load in the primary reformer, which means in fact decreasing the outlet temperature of said reformer, thereby allowing said reformer to operate, as well as all the synthesis gas production train downstream, at a pressure higher than that commonly used.

I have observed in the synthesis gas industry that adiabatic reforming of a hydrocarbon feedstock, with air or oxygen, in the presence of a catalyst, requires only a small amount of steam, much smaller than that necessary to steam reform the same feedstock in catalyst filled tubes heated by outside burners. This can be explained by the strong exothermic reaction which occurs instantaneously at the point of contact with free oxygen in the adiabatic reforming reactor, thus raising instantaneously the temperature of the reacting gas mixture above 750° C., and very often above 900° C., thereby avoiding the dangerous temperature range for carbon formation, which is believed to range from about 450° to about 650° C. On the opposite side, in the steam reforming reaction, the highly endothermic reaction proceeds slowly because it is depending on the heat transferred through the walls of the tubes, and therefore a large amount of steam is needed to cross slowly and safely said dangerous temperature range. Besides, it is well known in the art, as noted in U.S. Pat. No. 3,278,452, that the presence of hydrogen in the feed to a secondary adiabatic reforming with oxygen or air, in the presence of a catalyst, is a positive contribution in avoiding the risk of carbon formation, because hydrogen reacts instantaneously with oxygen, much faster than any hydrocarbon.

Thus, in the process of the present invention, the steam reforming in the upstream primary reformer of only one fraction of the total feedstock allows on one hand to reduce substantially the overall needs of steam to reform said total feedstock, and on the other hand to have in the feed to the secondary air reformer enough hydrogen to avoid the risk of carbon formation. Said feed to the secondary reformer is the mixture of the effluent gas from the primary steam reformer with the second fraction of the feedstock, which did not undergo a steam reforming reaction. In all the embodiments of this invention, the hydrogen content in the feed to the secondary reformer should be at least 5 mole percent, on a dry gas basis, and preferably at least 8 mole percent. Furthermore, a fraction of the hydrogen required in the feed to the secondary reformer may come from any one of the following sources, or any combination thereof: total or partial recycle of the gas released by depressurizing the solvent used for removing $CO_2$ from the synthesis gas, recycle of part of the synthesis gas taken after shift conversion and before $CO_2$ removal, recycle of part of the synthesis gas taken after $CO_2$ removal and before methanation, recycle of part of the synthesis gas taken after methanation and before the cryogenic separation, recycle of part of the synthesis gas taken after the cryogenic separation and before ammonia synthesis, total or partial recycle of the purge gas from the ammonia synthesis loop, as such or after an appropriate tretment which increases its hydrogen content.

In the process of this invention, the outlet temperature from the primary steam reforming is comprised between 680° and 820° C., and preferably between 720° and 780° C., that is appreciably lower than that commonly used for the production of ammonia synthesis gas; it follows that the heat released in the primary reformer, treating only a fraction of the total feedstock, is very small as compared to that of the conventional process. Under these conditions, as opposed to the conventional process, the amount of steam produced by heat recovery in the process may not be sufficient to drive all the main compressors of the ammonia plant, and the additional energy required for this purpose will preferably be electric power, the cost of which may be lower if produced in power plants using coal or nuclear energy.

Another consequence of the low heat liberation in the primary steam reformer, as compared to the conventional process, is that the cost of said reformer becomes a very small fraction of the total investment of the ammonia plant. Now, as the cost of said reformer increases linearly with capacity, whereas the cost of all other items of equipment increases much less than linearly, one can thus achieve, for larger ammonia plants, appreciable savings in investment by the process of the present invention.

In order to reduce further the high pressure steam requirements for reforming the feedstock, the process of this invention makes preferably use of a humidifier-dehumidifier system, already used industrially to transfer heat in the form of steam from one gas stream to another. By applying this system to the present case, the hot synthesis gas leaving the shift conversion reactor is cooled in a dehumidifier by direct countercurrent contact with water, which is thus heated. Alternately, the dehumidifier may be replaced, partially or totally, by a surface exchanger in which the water is heated by the low level heat of the synthesis gas. The hot water thus produced is then used to saturate with steam one or more of the following streams: the compressed air to be used in the secondary reformer, the first fraction of the feedstock which is going to the primary steam reforming, the second fraction of the feedstock which is going directly to the secondary reforming, or the total feedstock before splitting into two fractions. The supplementary steam required for the primary and secondary reforming reactions, after taking credit for that picked up in said humidifier-dehumidifier system, will be supplied by the steam production in the waste heat boiler at the outlet of the secondary reformer, and possibly by another waste heat boiler in the ammonia synthesis loop.

In order to limit further the amount of steam required for the primary steam reforming reaction, the process of the present invention preferably makes use of an observation I made concerning the risk of carbon formation in the steam reforming of hydrocarbons, according to which carbon dioxide may partially replace steam to avoid said risk, to the extent that the gas composition of the reacting mixture at the end of reaction does not show any possibility of carbon formation by any one of the possible reactions, which are:

(1)

(2)

(3)

By applying said observation to the present case, a fraction of the $CO_2$ removed from the synthesis gas by solvent scrubbing is preferably recycled to the inlet of the primary reformer, by mixing with the first fraction of the feedstock. Said recycle may be accomplished either by depressurizing the rich solvent to a lower pressure level and then compressing the gas thus flashed, or by desorbing said fraction of $CO_2$ from the solvent by direct countercurrent contact with the first fraction of the feedstock, in a desorption column containing trays or packings.

The large amount of nitrogen separated from the synthesis gas in the cryogenic separation step carries with it essentially all the methane present in the gas, and a very large fraction of the argon. The residual amount of argon left in the final synthesis gas, after cryogenic separation, is then removed from the ammonia synthesis loop either by dissolution in liquid ammonia, providing the argon partial pressure in said loop is allowed to rise to a sufficient level, or by a small purge of the ammonia loop, in addition to said dissolution. In the latter case, said purge is first cooled to condense essentially all the ammonia it contains, then preferably recycled to the raw synthesis gas at any point upstream the cryogenic separation, in order to upgrade all the hydrogen therein, while removing the argon in said cryogenic separation.

BRIEF DESCRIPTION OF THE DRAWINGS

A detailed description of the process of the present invention is given below in its preferred embodiments, by referring to FIGS. 1, 2 and 3 which are portions of a flow diagram showing the process, on which each item of equipment is identified by a number of which the first figure is that of the corresponding Figure.

DETAILED DESCRIPTION OF THE PREFERRED EMBODIMENTS

Figure 1:
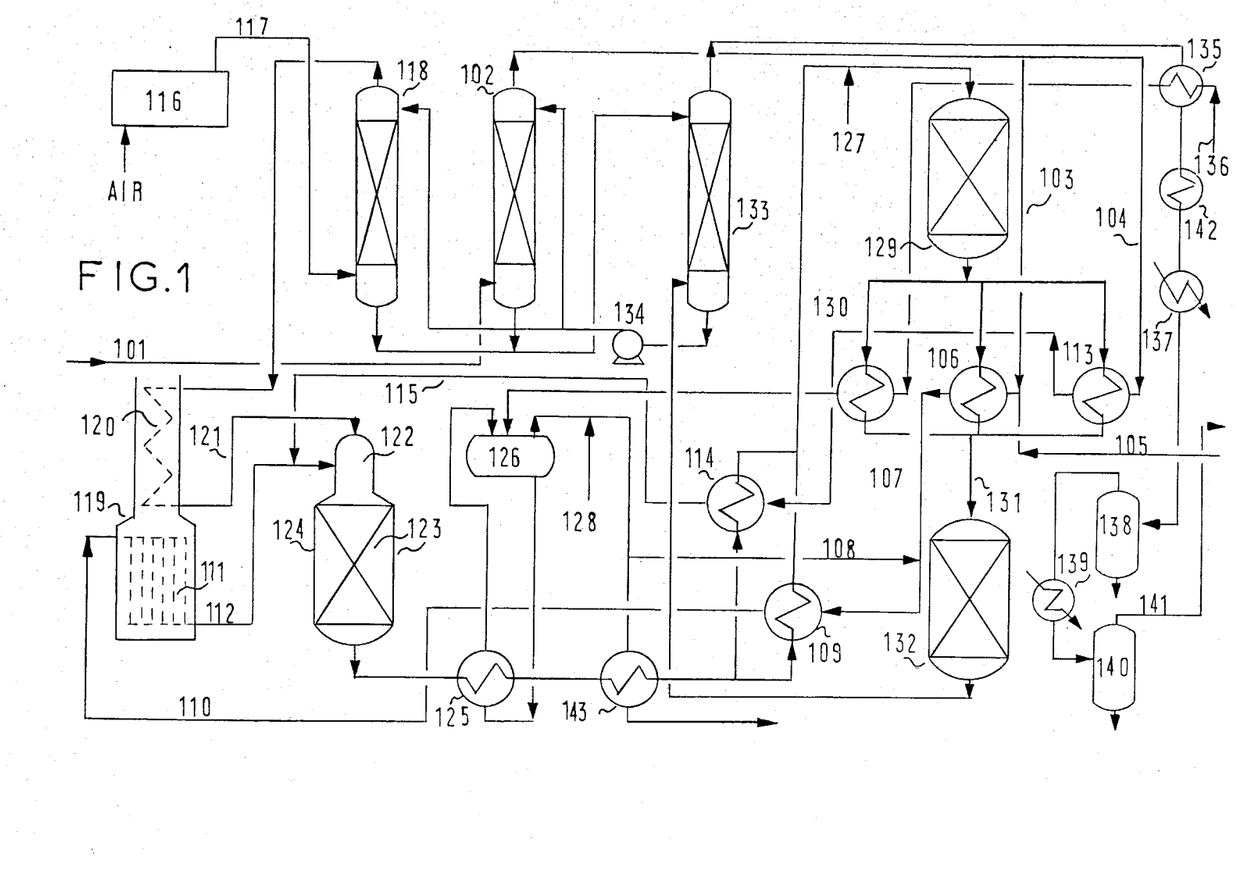

The feedstock arrives through conduit 101, and is desulfurized and available at a pressure of at least 30 bars, said pressure being sufficient to produce the final synthesis gas at the desired pressure level at the outlet of the cryogenic separation, without any compression or expansion. In general, the feedstock in conduit 101 is above ambient temperature, because it comes either from a sulfur removal section over a zinc oxide catalyst, or from the discharge of a compressor.

Figure 2:
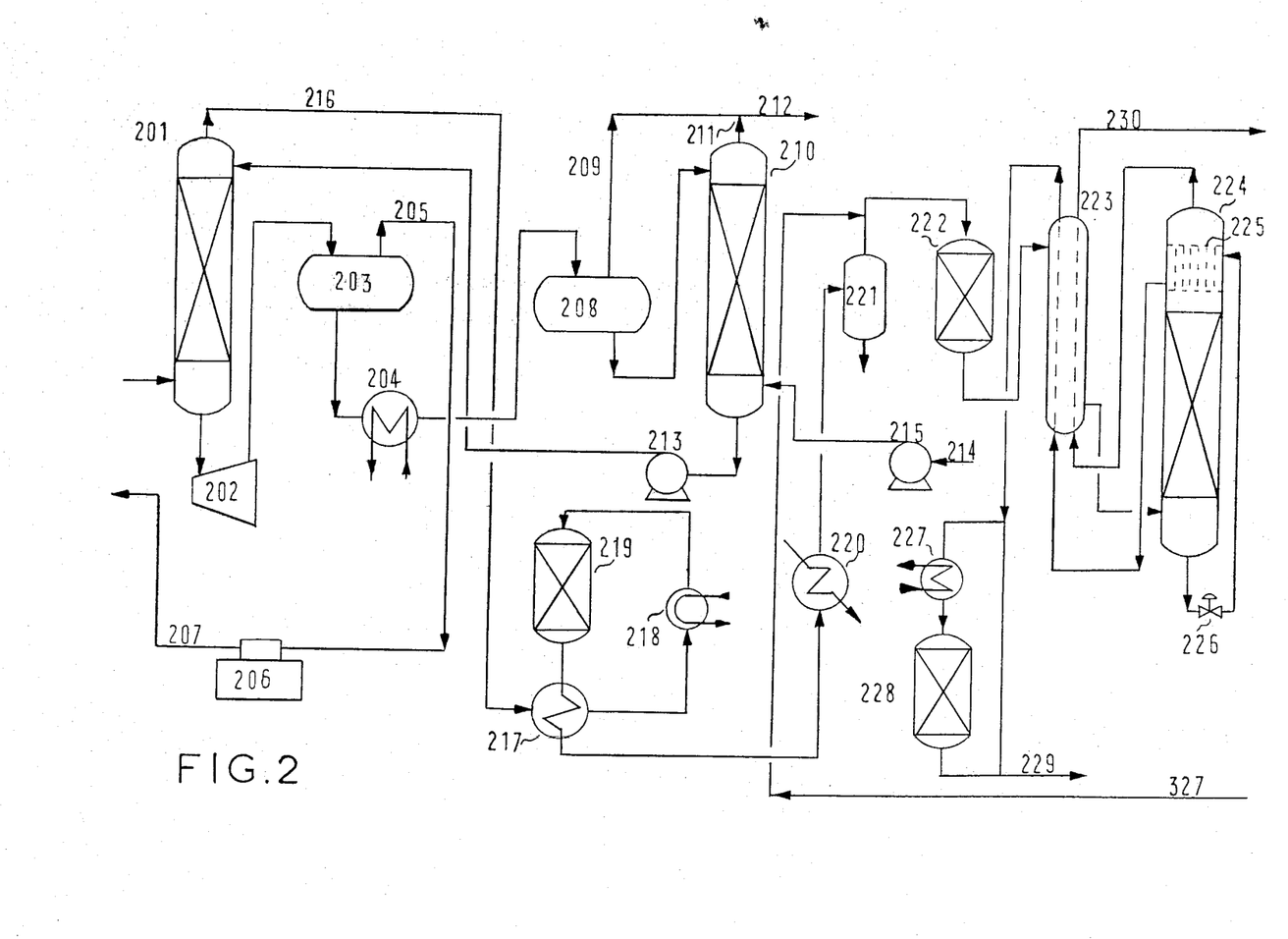

The feedstock, which is assumed here to be in a gaseous form, then flows upward in humidifier 102, countercurrent to part of the hot water from dehumidifier 133. Humidifier 102 is a tower containing packing, such as pall rings, or trays or any other gas-liquid contact device. The feedstock leaves the top of humidifier 102 saturated with steam, at a temperature comprised between about 160° and 270° C., and then is divided into two fractions. The first fraction therefrom, flowing in conduit 103, represents at least 5 percent, and a maximum 70 percent of the total feedstock; said first fraction is mixed with the $CO_2$ rich gas obtained by flashing the solvent used for $CO_2$ removal from the synthesis gas, said $CO_2$ rich gas flowing through conduits 105 and 207, after being compressed in compressor 206. The mixture thus obtained is then preheated firstly in exchanger 106, by heat exchange with part of the synthesis gas leaving shift reactor 129, then mixed with a supplementary amount of steam coming from steam drum 126 through conduit 108, and the mixture is preheated secondly in exchanger 109, by heat exchanger with part of the synthesis gas leaving secondary reformer 124. The preheated mixture in conduit 110 is then at a temperature higher than 350° C., and preferably higher than 400° C. The total amount of steam contained in the mixture thus obtained in conduit 110 corresponds to a steam/carbon ratio preferably comprised between 1.0 and 3.0, and in any case as low as possible, said ratio being the number of moles $H_2O$ per atom of hydrocarbon carbon atoms in said mixture.

Figure 3:
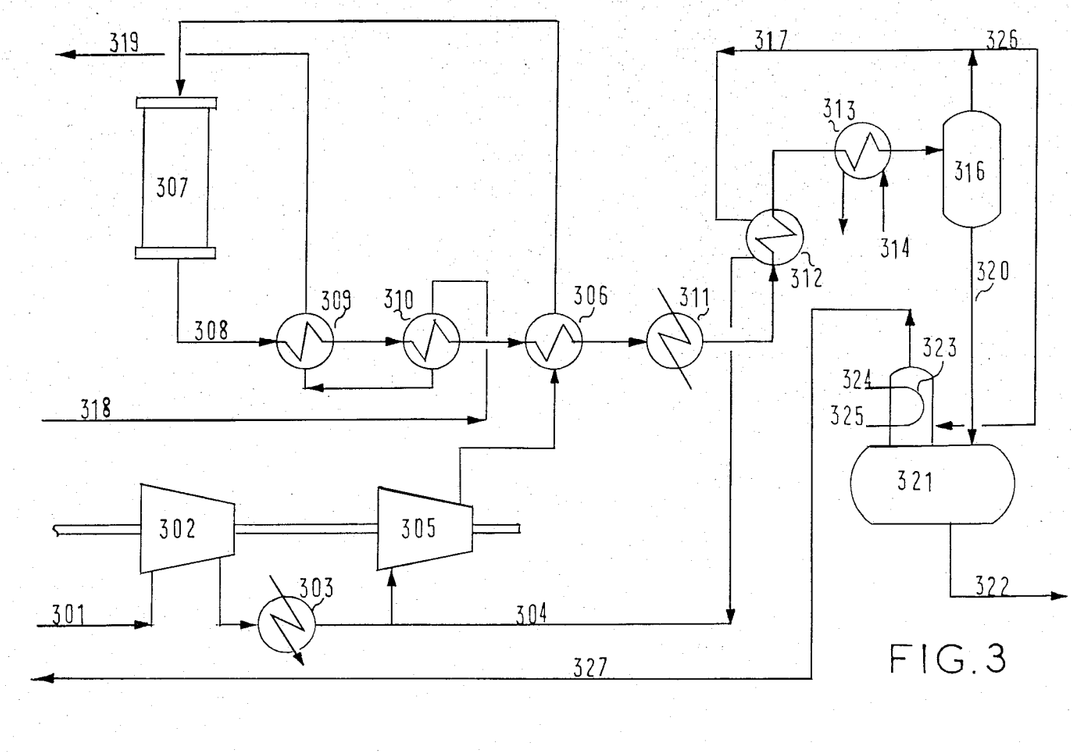

In another embodiment of this invention, the first fraction of the feedstock is also mixed, at any point between conduit 103 and conduit 110, with a recycled fraction of the raw synthesis gas produced downstream of the shift converter 132, or with the purge of the ammonia loop flowing through conduit 327.

The gas mixture containing the first fraction of the feedstock then enters from the top in a multitude of parallel tubes 111 located in the radiant section of primary reforming heater 119, said tubes containing one or more of the nickel based catalysts which are commonly used for steam reforming. The highly endothermic reaction which occurs at the contact of the catalyst produces a gas mixture containing $H_2$; CO, $CO_2$, $H_2O$ and $CH_4$, whereas all the hydrocarbons, other than methane, which were possibly present in the feedstock have practically disappeared in the reaction. The heat required for the reaction is transferred across the walls of catalyst tubes 111, and is supplied by a set of burners located in the radiant section of primary reformer 119, by combustion of part or all of the residual gas obtained through conduit 229 from the cryogenic separation; the extra fuel that may be required in said burners is supplied from another fuel source. The gas mixture leaving catalyst tubes 111 is at a temperature comprised 680° and 820° C., and preferably between 720° and 780° C., and has a methane content higher than 10 mole percent, and preferably higher than 15 mole percent, on a dry gas basis.

Considering the moderate temperature at the outlet of reforming tubes 111, and the pressure drop from conduit 101 to said outlet, the pressure at said outlet is at least 25 bars, and preferably at least 40 bars, while still using for said tubes the same refractory alloys as those presently used in the industry. In fact, these alloys, as used in the present invention, allow to operate at a pressure up to about 120 bars at the tubes outlet.

The second fraction of the feedstock, flowing in conduit 104, is preheated firstly in exchanger 113, by heat exchange with part of the synthesis gas leaving shift converter 129, and secondly in exchanger 114, by heat exchange with part of the synthesis gas leaving secondary reformer 124, to reach finally a temperature higher than 350° C., and preferably higher than 400° C. The preheated second fraction, flowing through conduit 115, is then mixed with the gas effluent from reforming tubes 111, flowing in conduit 112, and the mixture therefrom, which is the feed to secondary reformer 124, is injected in the gas mixing zone 122 of said reformer, preferably tangentially to the inside walls of said mixing zone. Said mixture is at a temperature of at least 550° C., and preferably at least 650° C., and contains at least 5 mole percent hydrogen, and a percent methane equivalent of at least 25 percent, and preferably at least 35 percent, on a dry gas basis. The expression "percent methane equivalent" as used herein means mole percent of hydrocarbons expressed as methane on a dry gas basis, e.g. 5 mole percent ethane is 10 percent methane equivalent.

The process air is compressed in compressor 116, having several compression stages with intermediate coolers, to a pressure level sufficient to feed it in secondary reformer 124. The compressed air is not cooled after the last compression stage, and arrives through conduit 117, at a temperature comprised between about 100° C. and about 180° C., at the bottom of humidifier 118 and flows upward therein, countercurrently to part of the hot water coming from dehumidifier 133 through pump 134. Humidifier 118 is a tower containing packings, such as pall rings, or trays, or any gas-liquid contact device. The air saturated with steam leaves the top of humidifier 118 at a temperature between about 160° C. and 270° C., and is then preheated in coil 120 located in the convection section of reforming heater

119, to a temperature higher than 400° C., and preferably higher than 500° C. If necessary, supplementary burners may be located in the convection section of reforming heater 119 to reach the desired preheat temperature of the process air. The latter flows then in conduit 121 to the mixing zone 122 of secondary reformer 124. Said mixing zone 122 is preferably designed as that described in European patent application 78400145.5, corresponding to U.S. patent application Ser. No. 077,607, and the apparatus for mixing the reacting gases in secondary reformer 124 is preferably the same as that described in said U.S. patent application; this is particularly desirable when the feedstock contains appreciable amounts of hydrocarbons heavier than ethane, because said hydrocarbons are more prone to carbon formation at high temperature, and said mixing apparatus is conceived to obtain quasi instantaneously a homogeneous gas mixture before the partial oxidation reaction proceeds significantly. However, other gas mixing devices may be used, for the sake of this invention, in the mixing zone of secondary reformer 124.

All the air required for the secondary reforming reaction is injected in a single step in mixing zone 122, and, due to the high temperatures of the reacting gases, the partial oxidation reaction starts immediately as the feed comes into contact with preheated air. Secondary reformer 124 contains, downstream of mixing zone 122, a reaction zone containing one single bed of catalyst 123, which may incorporate one or several layers of reforming catalysts; the catalyst bed may be either a fixed bed, with the gas mixture flowing preferably downward, or a fluidized bed, with the gas mixture flowing upward. Secondary reactor 124, including its mixing zone 122, are made of a metallic shell containing the pressure, and internally lined with one or several layers of refractory materials designed to resist the high temperatures prevailing in the reactor. The reaction of the process air with the feed to the secondary reformer raises appreciably the temperature of the reacting gas mixture; the overall exothermic reaction that takes place adiabatically in reactor 124, converts all the hydrocarbons present in said feed into a mixture of $H_2$, $CO$, $CO_2$ and $H_2O$, and leaves in the effluent gas from said reactor a molal methane percentage of less than one tenth of the percent methane equivalent contained in the feed to said reactor, on a dry gas basis. In any case, the methane content of the effluent from secondary reformer 124 is less than 6 mole percent, and preferably less than 4 percent, on a dry gas basis. The temparture of said effluent is comprised between 850° and 1100° C., and preferably between 900° and 1000° C. The catalyst or catalysts used in said reformer are the same as those commonly used for secondary air reforming in the industry, and which are made essentially of nickel on a refractory support.

The raw synthesis gas leaving secondary reformer 124 is cooled first in waste heat boiler 125, then in steam superheater 143, then in feedstock preheaters 109 and 114, positioned in parallel. The boiler feedwater, supposed deaerated, is fed through conduit 136, at a temperature comprised between about 100° and 140° C., and under the required pressure for steam generation; the pressure in steam drum 126 is higher than 40 bars, and preferably higher than 80 bars. The boiler feedwater is preheated firstly in exchanger 135, by heat exchange with the synthesis gas leaving dehumidifier 133, and secondly in exchanger 130, in which partial vaporization may occur, by heat exchange with part of the synthesis gas leaving conversion reactor 129. Between steam drum 126 and waste heat boiler 125, the water circulates either naturally, as represented on FIG. 1, or by means of water circulation pump. The saturated steam produced at the same pressure level in waste heat boiler 309 of the ammonia synthesis loop, arrives through conduit 128 and is mixed with the steam leaving steam drum 126; the extra process steam required for the primary reforming reaction is taken from the mixture thereof through conduit 108, and the remaining steam is superheated in steam superheater 143 to be used for driving compressors 116 and 302.

In another embodiment of this invention, the total amount of saturated steam produced at high pressure is superheated and used to drive compressors 116 and 302, and the required amount of said extra process steam is extracted at a lower pressure level from one of the steam turbines driving said compressors.

The synthesis gas produced in secondary reformer 124, after cooling in exchangers 109 and 114, is subjected to a quench, by injecting therein water flowing through conduit 127, in order to increase its steam content for the sake of the CO shift conversion reaction, and to reduce its temperature to a level comprised between about 340° and 400° C. for entering into shift reactor 129. The latter contains the usual high temperature shift conversion catalyst, composed essentially of iron oxide and chromium oxide. The exothermic reaction that occurs adiabatically in reactor 129, and represented by equation raises the temperature of the gas mixture to a level comprised between 420° and 520° C. approximately, and reduces the CO content of said mixture to about 2 to 4 mole percent, on a dry gas basis. The heat recovery on the gas effluent from reactor 129 is achieved in exchangers 106, 113 and 130, which are arranged in parallel to take advantage of the high temperature level of the gas leaving reactor 129.

The synthesis gas mixture obtained by combining effluent streams from exchangers 106, 113 and 130, flows through conduit 131 to shift reactor 132, at a temperature comprised between 200° and 240° C. approximately. The inlet temperature to reactor 132 should be selected by paying attention to the risk of steam condensation in said reactor; for this reason, said inlet temperature should preferably be a few degrees above the dew point of the reacting gas mixture; for the same reason, the heat recovery on the effluent gas from shift reactor 129 should preferably be carried by indirect heat exchange, as represented on FIG. 1, and not by quench water injection. Shift reactor 132 contains the low temperature shift conversion catalyst that is commonly used in the industry, made essentially of copper oxide, zinc oxide and alumina. The slightly exothermic reaction that occurs adiabatically in reactor 132 raises the gas mixture temperature by about 10° to 30° C. approximately; the CO content of the gas effluent from said reactor is less than 0.8 mole percent on a dry gas basis, and preferably less than 0.6 percent.

The preferred manner for heat recovery on the gas effluent from shift reactor 132 is to preheat first a water circulation stream by direct contact in dehumidifier 133; the latter is a tower containing packings, such as pall rings, or trays, or any other gas-liquid contact device. The hot water from the bottom of dehumidifier 133, which is at a temperature between 180° and 240° C.

approximately, is then pumped through pump 134, and divided into two fractions, the first fraction being injected at the top of humidifier 102 and the second fraction at the top of humidifier 118, as described above. The cooled water collected at the bottom of said humidifiers is then transferred to the top of dehumidifier 133, either by pressure differential between these towers, as represented on FIG. 1, or with the aid of a pump. The humidifier-dehumidifier system is thus a means of transferring steam, at high pressure level, from the raw synthesis gas to the feedstock and the process air, by using low level heat of said synthesis gas. The gas leaving the top of dehumidifier 133 is then cooled in exchanger 135, to preheat the boiler feedwater; preferably, the heat is then recovered in exchanger 142 to supply the heat required for an absorption refrigeration system, and then the synthesis gas is cooled in cooler 137 to about ambient temperature. If the synthesis gas is to be scrubbed with a physical solvent below ambient temperature for $CO_2$ removal, which is the case on FIG. 1 and FIG. 2, then the synthesis gas is further cooled in exchanger 139 to a temperature slightly above 0° C., by heat exchange with a refrigerant fluid such as ammonia, in order to condense as much as possible the steam therein, and the water condensate is separated in separator 140.

The synthesis gas should then be treated to remove essentially all the carbon dioxide it contains. Any $CO_2$ removal means may be used in the present invention; for example, the synthesis gas may be scrubbed with a chemical solvent such as ethanolamine, hot potassium carbonate or diglycolamine. However, the preferred means is to scrubb to synthesis gas with a physical solvent such as methanol, propylene carbonate, or the dimethylether of polyethylene glycol, in order to take advantage of the high $CO_2$ partial pressure and to save on energy consumption.

The process scheme represented on FIG. 2 is based on a physical solvent operating below ambient temperature. The synthesis gas leaving separator 140 through conduit 141 is fed at the bottom of absorber 201, in which it flows in direct countercurrent contact with the solvent. Absorber 201 contains packings, such as pall rings, or trays, or any other gas-liquid contact device. The rich $CO_2$ solvent is withdrawn from the bottom of absorber 201, then is subjected to a letdown to an intermediate lower pressure through power recovery turbine 202, thus flashing a gas containing most of the hydrogen dissolved; said gas is separated in separator 203, then compressed in compressor 206, and then recycled at any point of the process upstream of absorber 201, and preferably mixed with the first fraction of the feedstock through conduits 207 and 105. The rich solvent from separator 203 is then cooled in cooler 204, by heat exchange with a boiling refrigerant fluid, then expanded a second time to a lower pressure before reaching separator 208; this second expansion may be either through a valve, as represented on FIG. 2, or through another power recovery turbine, for further recovery of the pumping power. The solvent then flows, by pressure differential, to the top of regenerator 210, in which it flows downward in direct countercurrent contact with a regeneration gas such as air, nitrogen or steam. Regeneration by air is however preferred: said air is sucked through conduit 214 by fan 215, which discharges it to the bottom of regenerator 210, the latter operating at a pressure very close to atmospheric pressure. Said regenerator contains packings, such as pall rings, or trays, or any other gas liquid contact device.

The gas released in separator 208 is rich in $CO_2$ and can be used for urea synthesis for example; however, if it is required to recover a greater fraction of the original $CO_2$ contained in the synthesis gas, one can use steam to regenerate the solvent under vacuum, in regenerator 210, in order to obtain therefrom in conduit 211 a rich $CO_2$ stream suitable for urea synthesis. The regenerated solvent is withdrawn from the bottom of regenerator 210, pumped at high pressure through pump 213, and injected at the top of absorber 201. The power recovered in turbine 202 is used to drive pump 213, by coupling on the same shaft, the extra power required being supplied by another driver.

The scrubbed synthesis gas leaving the top of absorber 201 through conduit 216, has a residual $CO_2$ content of less than 0.15 mole percent, and preferably less than 0.05 percent, on a dry gas basis. Said gas is preheated in exchanger 217, by heat exchange with the gas leaving methanation reactor 219, and further preheated, if necessary, in exchanger 218, in the case the heat exchange in exchanger 217 is not sufficient to reach a temperature level comprised between 250° and 350° C. approximately, before entering reactor 219. Said reactor contains the methanation catalyst that is commonly used in the industry, composed essentially of nickel on a refractory support. The exothermic reaction that occurs adiabatically in the presence of the catalyst converts essentially all the carbon oxides contained in the gas into methane. The temperature rise accross reactor 219 is of the order of 25° to 50° C., and may be sufficient to preheat the feed gas to said reactor to the desired temperature level, in exchanger 217; if extra preheating is required in exchanger 218, the heat therein will be supplied either by the flue gas of primary reformer 119, or by the synthesis gas leaving shift reactor 129, or by the synthesis gas leaving exchangers 109 and 114. The gas effluent from reactor 219 is cooled first in exchanger 217, by heat exchange with the feed gas to said reactor, then in cooler 220 by means of a refrigerant fluid such as ammonia. The water thus condensed is separated in separator 221, and the gas is further dried in one of driers 222 and 228, both containing either silica gel, or alumina, or molecular sieves, or any combination thereof. Driers 222 and 228 are designed as usual in the industry, with one drier in operation while the other is being regenerated. Regeneration is carried with a fraction of the residual gas withdrawn from the bottom of tower 224, said fraction being preheated in exchanger 227 by using steam or electric power.

The dry synthesis gas leaving drier 222 contains a molal $H_2/N_2$ ratio of less than 2.4, and preferably less than 2.0; the purpose of the cryogenic separation step that comes next is to remove the excess nitrogen from said gas, and produce therefrom a synthesis gas having a molal $H_2/H_2$ ratio essentially equal 3.0. The gas leaving drier 222 is cooled in exchanger 223 to a temperature comprised between −170° and −195° C., by heat exchange with the gases leaving tower 224; an important fraction of the nitrogen contained in the synthesis gas is thus condensed, as well as essentially all the methane. The synthesis gas and the condensed liquid enter the bottom of cryogenic separation tower 224, which operates like a distillation tower, and contains packings such as pall rings, or trays, or any other gas liquid contact device. The liquid withdrawn from the bottom of tower 224 is flashed through a valve to a pressure below 6 bars absolute, then sent to the shell side of exchanger 225 located at the top of said tower; said liquid is entirely vaporized in exchanger 225, while on the tube side of said exchanger the vapor rising to the top of the tower is partially condensed to supply the required reflux for the distillation. One of the basic characteristics of the present invention is that the net refrigeration requirements of this cryogenic separation step are entirely supplied by flashing of at least part of the liquid withdrawn from the bottom of tower 224 to a pressure of less than 6 bars absolute, which means that the synthesis gas does not need to be expanded to provide such refrigeration. To achieve this goal, the molal $H_2/N_2$ ratio of the synthesis gas at the inlet of said cryogenic separation should be less than 2.4, and preferably less than 2.0. The synthesis gas leaving the top of tower 224, as well as the residual gas produced by vaporization on the shell side of exchanger 225, are separately reheated in exchanger 223, by heat exchange with the feed gas to the cryogenic separation. The residual gas thus obtained in conduit 229 contains essentially all the methane, and the greatest part of the argon, originally present in the synthesis gas leaving drier 222 or 228. Said residual gas is preferably used as fuel in primary reformer 119, for which it can supply the greatest part or even all the fuel requirements. A fraction of said residual gas, before being used as fuel, is used to regenerate driers 222 and 228 alternately, as mentioned above.

In another embodiment of the present invention, only part of the liquid withdrawn from the bottom of tower 224 is flashed to low pressure and then vaporized on the shell side of reflux condenser 225, whereas the other part is vaporized under high pressure in exchanger 223, then expanded to a low pressure in a power recovery turbine, then mixed with the other part to be used as fuel.

In another embodiment of this invention, driers 222 and 228 are entirely deleted, whereas twin exchangers 223 are provided to operate alternately: while the first exchanger 223 is in operation, thus accumulating ice deposits from the water vapor of the gas, the second exchanger 223 is being derimed to remove the ice deposits by vaporization, by circulating therein the residual gas from exchanger 225, said gas being then used as fuel.

The final synthesis gas in conduit 230 contains only a few ppm of carbon oxides, a few tens of ppm of methane, and an argon content of less than 0.3 mole percent, and preferably less than 0.2 mole percent; in addition, said synthesis gas has a molal $H_2/N_2$ ratio practically equal to 3.0. Said final synthesis gas, considering the pressure drop from the primary reformer to that point, is then at a pressure of at least 23 bars, and preferably of at least 38 bars; the gas flows then through conduit 301 to the suction of compressor 302, to be compressed to the ammonia synthesis loop pressure, which is usually comprised between 140 and 340 bars, for large capacity units. Compressor 302 may have one or several compression stages; however, in view of the high pressure at which the synthesis gas is available in conduit 301, compressor 302 would generally have a maximum of two stages for a reciprocating compressor, and a maximum of two casings for a centrifugal compressor.

The synthesis gas leaving compressor 302 is cooled in cooler 303 to about ambient temperature, then mixed with the recycle gas of the synthesis loop, which flows through conduit 304 at a temperature slightly below ambient temperature. The mixture thus obtained is then compressed in recycle compressor 305, the pressure differential of which is equal to the total pressure drop around the ammonia synthesis loop. The gas leaving compressor 305 has a molal ammonia content comprised between 2 and 7 percent approximately, and a molal argon content of less than about 15 percent, and preferably less than 10 percent; said gas is preheated in exchanger 306, by heat exchange with the gas effluent from synthesis reactor 307, then injected in said reactor at different positions, at a temperature between about 180° and 300° C., as usually practiced in the ammonia industry. Synthesis reactor 307 is designed as those presently used in the ammonia synthesis industry, and contains the same synthesis catalyst as commonly used to carry this reaction, which is made essentially of magnetic iron oxide reduced to iron by the hydrogen of the synthesis loop. At the contact of the catalyst, part of the hydrogen combines with nitrogen to form ammonia. The exothermic heat of reaction raises the reacting gas mixture temperature to a level comprised between about 400° and 500° C. Synthesis reactor 307 is equipped with an internal electric resistance, or an external heater, for heating the catalyst during start-up periods.

The heat contained in the gas leaving reactor 307 through conduit 308 is recovered first in waste heat boiler 309, to produce high pressure steam, then in boiler feedwater preheater 310, then in exchanger 306, by heat exchange with the gas feed to reactor 307; the gas is then cooled first in water cooler 311, then in exchanger 312, by heat exchange with the recycle gas flowing through conduit 317, then in cooler 313 by heat exchange with a boiling refrigerant fluid such as ammonia, to reach a temperature comprised between about 2° and 12° C., in order to condense as much as possible the ammonia produced in the reaction. The liquid ammonia thus produced is then separated in separator 316, and the gas leaving the latter is then preheated in exchanger 312 and recycled to the suction of recycle compressor 305, as described above. A very small fraction of the gas leaving separator 316, usually known as high pressure purge, may be withdrawn from the loop through conduit 326, then expanded to a pressure slightly above that of the suction of compressor 302, then cooled to less than about −15° C. in cooler 323, by heat exchange with a boiling refrigerant fluid such as ammonia, in order to recover most of the ammonia it contains, then recycled back in the process at any point upstream the cryogenic separation, that is mixed with the raw synthesis gas at any point of the production train upstream exchanger 223. The recycle of said high pressure purge is a means of removing the argon it contains, while upgrading the hydrogen therein.

The liquid ammonia withdrawn from separator 316 is flashed to a pressure slightly above that of the suction of compressor 302, and the gas thus released is separated from the liquid in separator 321, then cooled at a temperature below about −15° C. in cooler 323, preferably jointly with the aforesaid high pressure purge, by heat exchange with a boiling refrigerant fluid such as ammonia, in order to recover most of the ammonia therein. The gas leaving cooler 323, and corresponding to the flash of liquid ammonia, is also recycled back in the process, that is mixed with the synthesis gas at any point of the synthesis gas production train, upstream the cryogenic separation. The liquid ammonia leaving separator 321 may then be sent to storage, or used directly by consumers in downstream units, for example in fertilizer production.

From the above description, it is to be noted that the argon contained in the final synthesis gas at the suction of compressor 302 may be removed from the ammonia synthesis loop by two different ways; in the first way, the argon partial pressure in the loop is allowed to rise to a level such that all the argon introduced in the loop is removed by solubility in liquid ammonia in separator 316, without the need of high pressure purge from the loop. In the second way, a high pressure purge is withdrawn from the loop through conduit 326, thus removing part of the argon introduced in the loop, the other part being still removed by solubility in liquid ammonia in separator 316. The choice between these two ways of removing argon is a matter of economic optimization. In both ways, the argon removed from the synthesis loop is further removed in the cryogenic separation step, by virtue of the aforesaid recycle to upstream said cryogenic separation, the latter acting as an argon barrier.

Ammonia is preferably used as refrigerant fluid in exchangers 204, 313 and 323. For exchangers 204 and 313, it is preferable to use an absorption refrigeration system, because the heat that may be recovered in exchanger 142 is generally sufficient to operate such a system, the temperature level of the boiling refrigerant in exchangers 204 and 313 being very close, if not identical.

From the above description, it is noted that the amount of air introduced in secondary reformer 124 is such that the gas effluent from methanation reactor 219 has a molal $H_2/N_2$ ratio of less than 2.4. This means that the amount of nitrogen contained in the gas effluent from secondary reformer 124 is appreciably larger than that required to convert to ammonia all the potential hydrogen therein; the expression "potential hydrogen" as used herein means the amount of hydrogen that will be left in the synthesis gas after the steps of CO shift conversion, $CO_2$ removal and methanation. Said amount of hydrogen may be calculated starting from the total amount of ($H_2+CO$) contained in the gas effluent from the secondary reformer, from which are subtracted the losses incured downstream, namely: the loss due to the residual CO content at the outlet of shift converter 132, the loss in tower 201 due to the solubility of hydrogen in the solvent, and the loss in methanator 219 to convert into methane essentially all the carbon oxides. Considering these losses, and neglecting any recycle of hydrogen-containing gas from downstream to upstream the gas production train, it is therefore recognized that in order to obtain a molal $H_2/N_2$ ratio of less than 2.4 at the outlet of methanator 219, the amount of nitrogen contained in the gas effluent from secondary reformer 124 must be more than 125 percent of that required to convert to ammonia all the potential hydrogen contained in said gas effluent.

The above described process of this invention incorporates several catalytical reactions which are already practiced industrially, although usually at a lower pressure than that preferred for this invention. It is to be noted that in all the catalytic reactions of the present invention, the physical composition, method of fabrication and physical properties of the catalysts used therein form no part of this invention.

An example of application of the present invention is given hereafter, based on a feedstock composed of methane only. In this example, the pressures are in bars absolute, and all the quantities are expressed in kg. moles/hour. The total feedstock in conduit 101 is at 120° C. and 73.8 bars, and contains 1425.50 moles $CH_4$. At the outlet of humidifier 102 at 201° C. the feed contains 404.70 moles $H_2O$. The first fraction of the feedstock, in conduit 103, contains 427.65 moles $CH_4$, that is 30 percent of the total, and the second fraction in conduit 104 contains 997.85 moles $CH_4$. The recycle gas through conduit 105 contains 38.16 moles $H_2$, 27.27 moles $N_2$, and 427.65 moles $CO_2$. The steam added through conduit 108 to the first fraction is 733.90 moles $H_2O$, and the mixture is preheated to 500° C. at the outlet of exchanger 109. The second fraction of the feedstock is preheated to 632° C. in exchanger 114. The process air in conduit 117 is at 72.5 bars and 150° C., and contains 2589.57 moles $N_2$, 694.80 moles $O_2$, 30.99 moles A and 3.31 moles $CO_2$. After passing through humidifier 118, the process air is at 200° C. and contains 942.23 moles $H_2O$. The hot water enters humidifiers 102 and 118 at 203° C. and leaves at 160° C.; the water flow is 12,793 moles $H_2O$ at the inlet of humidifier 118 and 6401 moles $H_2O$ at the inlet of humdifier 102. The water flow at the inlet of dehumidifier 113 is 17,847 moles $H_2O$.

The gas leaving reforming tubes 111 is at 760° C. and 70.8 bars, and contains 370.51 moles $H_2$, 157.50 moles CO, 392.61 moles $CO_2$, 305.19 moles $CH_4$ and 767.88 moles $H_2O$. Reforming tubes 111 contain 6 m3 heated volume of the usual nickel based reforming catalyst, and the heat absorbed in the reforming reaction in said tubes is equal 12.6 MMKcal/h. The process air is preheated to 720° C. in exchanger 120, located in the convection section of heater 119. The feed to secondary reformer 124 contains 1303.04 moles $CH_4$, that is 57.8 methane percent on a molal and dry gas basis. The gas leaving secondary reformer 124 is at 960° C. and 70.3 bars, and contains 2632.76 moles $H_2$, 1149.77 moles CO, 564.68 moles $CO_2$, 142.01 moles $CH_4$, 2616.84 moles $N_2$, 30.99 moles A and 2053.21 moles $H_2O$. Secondary reformer 124 contains 23 m3 of the usual secondary reforming catalyst, made of nickel on a refractory support. The gas effluent from secondary reformer 124 is cooled in waste heat boiler 125, then in exchangers 143, 109 and 114, then is quenched to 360° C. by injection of 1689.35 moles of water through line 127, and then enters reactor 129; the gas leaves said reactor at 456° C., with a CO content of 3.57 mole percent on a dry basis. Shift converter 129 contains 60 m3 of the usual high temperature shift catalyst, made essentially of iron oxide and chromium oxide. The gas enters shift converter 132 at 210° C., after indirect heat exchange in exchangers 106, 113 and 130, and leaves said reactor at 235° C. and 68.7 bars, containing 3749.61 moles $H_2$, 32.92 moles CO, 1681.53 moles $CO_2$, 142.01 moles $CH_4$, 2616.84 moles $N_2$, 30.99 moles A and 2625.71 moles $H_2O$. Shift reactor 132 contains 57 m3 of the usual low temperature shift catalyst, based on copper as active component.

The synthesis gas leaves dehumidifier 133° at 174° C. and 68.5 bars, than exchanger 135 at about 168° C., then exchanger 142 at about 133° C. In exchanger 135, the boiler feedwater, supposed deaerated, is preheated from 120° to 160° C. In the case the boiler feedwater arrives non-deaerated and at ambient temperature, it would be preferably preheated to about 100° C. by use of the heat available in the gas leaving exchanger 142 at 133° C. After final ammonia cooler 139, the synthesis gas is at 5° C. and 67.7 bars. The solvent used for $CO_2$ removal in absorber 201 is the dimethylether of polyethylene glycol. The gas leaving absorber 201 at about 5° C. contains 3680.79 moles $H_2$, 32.92 moles CO, 3.29 moles $CO_2$, 142.01 moles $CH_4$, 2567.76 moles $N_2$ and 30.99 moles A. The solvent flows through power recovery turbine 202, then arrives in separator 203 at about 20 bars, where the gas released contains 38.16 moles $H_2$, 27.27 moles $N_2$ and 427.65 moles $CO_2$, and said gas is compressed through compressor 206 and recycled through conduit 207 to the first fraction of the feedstock. The solvent withdrawn from separator 203 is cooled in ammonia cooler 204, then throttled through a valve and injected at the top of regenerator 210; in the latter, the solvent is regenerated by a countercurrent flow of air, injected through fan 215, at a pressure very close to atmospheric pressure. The amount of refrigeration to be supplied through exchanger 204 is the result of a global heat balance around the $CO_2$ removal system.

The synthesis gas is then preheated to 320° C. in exchanger 217, then enters at that temperature in methanation reactor 219, and leaves said reactor at 360° C. and 66.3 bars; the gas is then cooled in exchanger 217 to about 45° C., and it contains at that point 3568.87 moles $H_2$, 2567.76 moles $N_2$, 178.22 moles $CH_4$, 30.99 moles A, and les than 10 ppm by volume of carbon oxides. Methanation reactor 219 contains 20 m3 of the usual methanation catalyst, which is nickel based. The gas is then cooled to 5° C. in ammonia cooler 220, then is mixed with recycle gas flowing through conduit 327 and containing 27.01 moles $H_2$, 9.0 moles $N_2$, 0.14 moles $CH_4$, 2.83 moles A and 0.77 moles $NH_3$; the mixture thus obtained is then dried over drier 222, which contains activated alumina and a small quantity of molecular sieves to retain the traces of ammonia from the recycle gas. The final synthesis gas leaving through conduit 230 at about 0° C. and 65.1 bars contains 3463.83 moles $H_2$, 1154.61 moles $N_2$, 3.72 moles A and 0.18 moles $CH_4$. The residual gas from the cryogenic separation, flowing in conduit 229 at a pressure of 3 bars, contains 132.05 moles $H_2$, 1422.15 moles $N_2$, 30.10 moles A, 178.18 moles $CH_4$ and 0.77 1 moles $NH_3$. The final synthesis gas is then compressed in compressor 302 to 168 bars, then mixed with the recycle gas of the synthesis loop flowing through conduit 304 and containing 10472.19 moles $H_2$, 3490.73 moles $N_2$, 869.45 moles $NH_3$, 946.58 moles A and 22.06 moles $CH_4$; the mixture thus obtained is further compressed to 183 bars in compressor 305, then preheated to about 240° C. in exchanger 306 and injected in synthesis reactor 307, which contains 38 m3 of the usual ammonia synthesis catalyst, made essentially of reduced iron oxide. The gas leaves reactor 307 at about 460° C. and 177 bars, containing 10506.60 moles $H_2$, 3502.20 moles $N_2$, 3155.73 moles $NH_3$, 950.30 moles A and 22.24 moles $CH_4$. From separator 316 at 10° C. and 170 bars, the liquid withdrawn through conduit 320 contains 2284.90 moles $NH_3$, 19.35 moles $H_2$, 6.45 moles $N_2$, 2.34 moles A and 0.12 moles $CH_4$; the high pressure purge through conduit 326 contains 15.06 moles $H_2$, 5.02 moles $N_2$, 1.38 moles A, 1.38 moles $NH_3$ and 0.06 moles $CH_4$. The gas released in separator 321 by liquid ammonia contains 11.95 moles $H_2$, 3.98 moles $N_2$, 1.45 moles A and 0.07 moles $CH_4$; said gas is mixed with the high pressure purge flowing through conduit 326, and the mixture thereof is cooled to $-29°$ C. in exchanger 323, by heat exchange with boiling ammonia, from which it leaves with only 0.77 moles $NH_3$, and is then recycled upstream drier 222 as mentioned above. The liquid withdrawn from separator 321 contains 2285.51 moles $NH_3$, 7.39 moles $H_2$, 2.46 moles $N_2$, which corresponds to a daily ammonia production of 934.2 metric tons.

The heat exchanged in exchanger 142, which is about 9.5 MMKcal/h, is used in an ammonia absorption refrigeration system designed to meet the requirements of coolers 313, 204 and 220. The steam is produced at 120 bars in waste heat boilers 125 and 309, the latter producing 2280 moles and the former 2860 moles $H_2O$ approximately; after taking 733.9 moles $H_2O$ for the primary reforming reaction, about 4406 moles are left, which are superheated to 525° C. in exchanger 143 and used to drive, through condensing turbines, air compressor 116 having about 8040 Kw horsepower, and synthesis gas compressors 302 and 305 having about 9000 Kw combined horsepower.

In the example given above, the total quantity of methane consumed is 1425.50 kg.moles/hour, which represents a consumption of 7.02 MMKcal per metric ton of liquid ammonia, whereas the extra amount of residual gas from the cryogenic separation, after supplying all the fuel requirements of primary reformer 119, represents a credit of 0.25 MMKcal/metric ton; therefore, the net consumption is equal 6.77 MMKcal/metric ton, assuming that electric power is used to satisfy the other energy needs of the ammonia plant, such as natural gas compression if necessary, and driving the solvent circulation pumps for $CO_2$ removal. Even when taking into account said other energy needs, the overall energy consumption of the process of the present invention is in the range of 6.9 to 7.2 MMKcal/ton of ammonia, that is much lower than that of the conventional steam reforming process, which ranges from 7.6 to 8.1 MMKcal/ton. Furthermore, the investment cost of an ammonia plant designed according to the example given above is about 10 percent lower than that of a conventional ammonia plant.

The example given above represents an economical optimum in the case where a useful outlet can be found for the excess residual gas available from conduit 229, after satisfying all the fuel requirements of reforming heater 119. In reducing to practice the present invention, one must consider several parameters and select their values as a function of the general economic conditions and the particular constraints of the industrial environment. The pressure in the primary and secondary reformings is selected generally as high as possible, as a function of the quality and the metallurgy of reforming tubes 111, and this defines consequently the number of casings of compressor 302 to reach the pressure of the synthesis loop, often comprised between 150 and 220 bars for the quality of synthesis gas obtained in this invention. The split of the feedstock between the two fractions must take into account the type of hydrocarbons contained therein; when the feedstock has a high methane content, the first fraction, to be steam reformed, is preferably comprised between 5 and 35 percent of the total feedstock; when the feedstock contains a high percentage of ethane and propane, the first fraction is preferably comprised 25 and 50 percent of the total; when the feedstock contains mostly butane and higher hydrocarbons, the first fraction is preferably comprised between 50 and 70 percent of the total feedstock. The outlet temperature of the primary reformer, as well as the air preheat temperature to the secondary reformer, are also selected as a function of the quality and the metallurgy of the tubes used in the corresponding functions, and preferably as high as possible; when selecting the refractory alloys that are presently used in the industry, one can economically preheat the process air to about 700 to 750° C., and have an outlet temperature from primary reformer 119 of about 750° to 780° C., with pressures ranging from 50 to 80 bars.

In reducing to practice the present invention, another important consideration concerns the global energy balance; if the cost of electric power is appreciably lower than that of hydrocarbon energy, it is found advantageous to minimize the first fraction of the feedstock, and therefore use a large excess of nitrogen in the secondary reformer, leading to a molal $H_2/N_2$ ratio in the order of 1.0 to 1.6 at the inlet of the cryogenic separation, which corresponds to an excess nitrogen of 87.5 to 200 percent, as compared to that required to convert to ammonia all the potential hydrogen contained in the gas effluent from the secondary reformer. Nevertheless, in some cases, it may be necessary to limit the amount of excess nitrogen in the secondary reformer to that which allows to balance the fuel requirements of primary reformer 119 with the heat available in the residual gas in conduit 229. On the other hand, it may be preferable in other cases to select the parameters values so that the steam produced in the waste heat boilers is just equal to the steam requirements of the ammonia plant.

There are several ways to reduce to practice the present invention when two or several feedstocks are to be used simultaneously. For example, one can either mix the feedstocks at the start, partially or completely, and then proceed with the split between the two fractions as described above, or one can select one or two of said feedstocks to be steam reformed in the primary steam reforming step, and then inject all the other feedstocks directly into the secondary reforming step. This latter mode of operation is particularly desirable when the various feedstocks contain a very wide range of hydrocarbons: in this case, the heavier hydrocarbons will preferably be steam reformed in the primary reforming, to avoid the risk of carbon formation in the secondary reformer, and the lighter hydrocarbons will preferably be sent directly to the secondary reforming. These various means of combining the feedstocks, although not examplified in the above example, are within the spirit of the present invention, which is based on an original combination of processing steps, said combination offering the same advantages whatever number and combination of feedstocks are used.

While particular embodiments of the present invention have been described, it will be understood of course that this invention is not limited thereto since many modifications may be made, and it is therefore contemplated to cover by the appended claims any and all such modifications, as may fall within the true spirit and scope of this invention.

What I claim is:

1. A process for producing ammonia from a desulfurized hydrocarbon containing feedstock available at a pressure of at least 30 bars, comprising:
   (a) dividing said feedstock into two fractions, the first fraction representing 5 to 70 percent of the total feedstock,
   (b) subjecting only the first fraction from (a) to a primary steam reforming reaction, by mixing said fraction with steam, and heating the mixture thereof by indirect heat exchange, in the presence of a reforming catalyst, to form a gaseous effluent including hydrogen at a temperature between 680° and 820° C.
   (c) combining the gaseous effluent from (b) with the second fraction from (a), to obtain a gas mixture at a minimum temperature of 550° C. and containing at least 5 mole percent hydrogen and at least 25 percent methane equivalent, on a dry gas basis,
   (d) reacting in a single step the gas mixture from (c) with compressed air in a secondary reforming reactor operating under essentially adiabatic conditions and comprising a gas mixing zone and a reaction zone, the amount of air injected in said mixing zone being sufficient to initiate therein the partial oxidation reaction, and said reaction zone containing a single bed of catalyst or catalysts, thus producing a raw synthesis gas at a temperature between 850° and 1100° C. and containing an amount of nitrogen appreciably larger than that required to convert to ammonia all the potential hydrogen contained therein, and a molal methane percentage of less than one-tenth of the percent methane equivalent contained in the gas mixture from (c),
   (e) shift converting to carbon dioxide carbon monoxide contained in the gas effluent from (d), by reacting said gas affluent with steam in the presence of at least one shift conversion catalyst,
   (f) removing essentially all the carbon dioxide contained in the gas effluent from (e), by scrubbing with a solvent,
   (g) methanating the residual carbon oxides contained in the gas effluent from (f), by reacting with part of the hydrogen therein, in the presence of a methanation catalyst, thus producing a synthesis gas having a molal $H_2/N_2$ ratio less than 2.4,
   (h) removing the excess nitrogen contained in the gas effluent from (g) by partial condensation and subsequent distillation of said gas effluent at a temperature between $-175°$ and $-190°$ C., thereby producing a final synthesis gas having essentially the stoichiometric composition for ammonia synthesis, and a liquid containing said excess nitrogen, all the refrigeration requirements of said removal being supplied by the expansion of at least part of said liquid to a pressure below 6 bars absolute,
   (i) compressing the final synthesis gas produced in (h), and injecting said gas into an ammonia synthesis loop where liquid ammonia is thus produced,
   (j) withdrawing the liquid ammonia produced in (i) and letting it down to a pressure above that of the final synthesis gas produced in (h),
   (k) recycling at least part of the gas released in step (j) to any point of the process sequence upstream of the excess nitrogen removal step (h).

2. A process according to claim 1 wherein a purge gas stream is extracted from the ammonia synthesis loop in step (i), after separation of liquid ammonia, then expanded to a pressure above that of the final synthesis gas produced in (h), then at least partially recycled to any point of the process sequence upstream of the removal of excess nitrogen in step (h).

3. A process according to claim 1 wherein at least part of the gas released by letting down the solvent used in step (f) is recycled back to the process upstream secondary reforming step (d).

4. A process according to claim 1 or 2, wherein the heat contained in the gas effluent from (e) is partially used to heat a water stream which is further used to saturate with steam the compressed air to the secondary reforming, by direct countercurrent contact.

5. A process according to claim 1 or 3, wherein the heat contained in the gas effluent from (e) is partially used to heat a water stream which is further used to saturate with steam at least part of the feedstock by direct countercurrent contact.

6. A process for producing ammonia synthesis gas from a desulfurized hydrocarbon containing feedstock available at a pressure of at least 30 bars, comprising:
  (a) dividing said feedstock into two fractions, the first fraction representing 5 to 70 percent of the total feedstock,
  (b) subjecting only the first fraction from (a) to a primary steam reforming reaction, by mixing said fraction with steam, and heating the mixture thereof by indirect heat exchange, in the presence of a reforming catalyst, to form a gaseous effluent including hydrogen at a temperature between 680° and 820° C.,
  (c) combining the gaseous effluent from (b) with the second fraction from (a), to obtain a gas mixture at a minimum temperature of 550° C. and containing at least 5 mole percent hydrogen and at least 25 percent methane equivalent, on a dry gas basis,
  (d) reacting in a single step the gas mixture from (c) with compressed air in a secondary reforming reactor operating under essentially adiabatic conditions and comprising a gas mixing zone and a reaction zone, the amount of air injected into said mixing zone being sufficient to initiate therein the partial oxidation reaction, and said reaction zone containing a single bed of catalyst or catalysts, thus producing a raw synthesis gas at a temperature between 850° and 1100° C. containing an amount of nitrogen appreciably larger than that required to convert to ammonia all the potential hydrogen contained therein, and a molal methane percentage of less than one-tenth of the percent methane equivalent contained in the gas mixture from (c),
  (e) shift converting to carbon dioxide carbon monoxide contained in the gas effluent from (d), by reacting said gas effluent with steam in the presence of at least one shift conversion catalyst,
  (f) removing essentially all the carbon dioxide contained in the gas effluent from (e), by scrubbing with a solvent,
  (g) methanating the residual carbon oxides contained in the gas effluent from (f), by reaction with part of the hydrogen therein, in the presence of a methanation catalyst, thus producing a synthesis gas having a molal $H_2/N_2$ ratio less than 2.4,
  (h) removing the excess nitrogen contained in the gas effluent from (g) by partial condensation and subsequent distillation of said gas effluent at a temperature between $-175°$ and $-190°$ C., thereby producing a final synthesis gas having essentially the stoichiometric composition for ammonia synthesis, and a liquid containing said excess nitrogen, all the refrigeration requirements of said removal being supplied by the expansion of at least part of said liquid to a pressure below 6 bars absolute.

7. A process according to claim 6 wherein the solvent used in step (f) is let down and is then recycled back to the process upstream of the secondary reforming step (d).

8. A process according to claim 6 or 7, wherein the heat contained in the gas effluent from (e) is partially used to heat a water stream which is further used to saturate with steam at least part of the feedstock by direct countercurrent contact.

9. A process according to claim 6 or 7, wherein the heat contained in the gas effluent from (e) is partially used to heat a water stream which is further used to saturate with steam the compressed air to the secondary reforming, by direct countercurrent contact.

* * * * *